(12) United States Patent
Härtel

(10) Patent No.: US 6,702,075 B2
(45) Date of Patent: Mar. 9, 2004

(54) CONTROLLABLE SHOCK ABSORBER

(75) Inventor: Volker Härtel, Hannover (DE)

(73) Assignee: Continental Aktiengesellschaft, Hannover (DE)

( * ) Notice: Subject to any disclaimer, the term of this patent is extended or adjusted under 35 U.S.C. 154(b) by 106 days.

(21) Appl. No.: 10/023,221

(22) Filed: Dec. 20, 2001

(65) Prior Publication Data
US 2002/0121415 A1 Sep. 5, 2002

(30) Foreign Application Priority Data
Dec. 23, 2000 (DE) .......................... 100 65 184

(51) Int. Cl.[7] .................................. F16F 9/34
(52) U.S. Cl. .................. 188/282.1; 188/282.2; 188/299.1
(58) Field of Search .......................... 188/282.3, 319.1, 188/299.1, 322.13, 322.22, 322.15, 313, 282.1, 282.2, 282.8

(56) References Cited

U.S. PATENT DOCUMENTS

| | | | |
|---|---|---|---|
| 4,596,320 A | | 6/1986 | Shimokura et al. |
| 4,946,009 A | * | 8/1990 | Knutson ............... 188/282.3 |
| 5,166,965 A | * | 11/1992 | Collier ................ 188/282.2 |
| 5,303,803 A | | 4/1994 | Grün et al. |
| 6,293,377 B1 | * | 9/2001 | Okada et al. ............ 188/282.2 |

FOREIGN PATENT DOCUMENTS

| | | |
|---|---|---|
| DE | 29 11 768 A1 | 10/1980 |
| DE | 38 00 865 A1 | 10/1988 |
| DE | 89 02 280 U1 | 5/1989 |
| DE | 82 29 250 U1 | 4/1990 |
| DE | 40 25 880 | 2/1992 |
| DE | 43 25 252 A1 | 3/1994 |
| DE | 44 18 972 A1 | 12/1995 |
| DE | 195 42 409 A1 | 5/1997 |
| DE | 199 50 177 | 5/2000 |
| EP | 0 651 174 A1 | 5/1995 |

* cited by examiner

Primary Examiner—Pam Rodriguez
(74) Attorney, Agent, or Firm—Smith, Gambrell & Russell

(57) ABSTRACT

Controllable shock absorber with a damping valve controllable within a passage or bypass located between the lower working space and the upper working space, such that in the push and pull stage control of the damping force is possible, in which the controllable damping valve is designed so that the piston stroke in the push or pull stage, a flow through the passage that is varible over the duration of the piston stroke can be controlled by variation in the flow cross section at a minimum of one point of the passage.

8 Claims, 1 Drawing Sheet

CONTROLLABLE SHOCK ABSORBER

INTRODUCTION AND BACKGROUND

The present invention pertains to a controllable shock absorber comprising a damping cylinder filled with damping fluid, with a piston rod linked with a damping piston sliding therein, said piston dividing the damping cylinder into two working spaces, and with at least one controllable damping valve that permits control of the damping force in the push and pull stages.

The design of a controllable shock absorber is disclosed in EP 0 651 174 A1, in which an additional and controllable damping valve system—designed here as an additional valve assembly adjacent to the shock absorber—is located between an operating space and a pressure reservoir of a level-control system, and optionally also within a bypass between the two working spaces of a shock absorber, but where the latter is only mentioned and is not further discussed.

With the assistance of the controllable damping valve system presented therein, it is possible, of course, to adjust in the push and in the pull stage four different characteristic curves of the damping force, so that ultimately it is possible only to set a more or less specific "firmness" of the damping of the shock absorber, which is then the same for the entire operating range, or for all stroke or damping variations at this setting.

For modern motor vehicles with electronic chassis control, such as those with an electronic stability program (ESP), anti-lock braking system (ABS) or anti-slip regulation (ASR), operating individually or in combination, the setting of a specific characteristic curve with a more or less firm damping is only conditionally helpful, since for a fast electronic chassis control that will respond in fractions of a second to hazard situations, a variable damping control adapted to these situations cannot be effected by means of specific and preset characteristic curves.

Therefore, it was an object of the present invention to have a damping control, suitable for incorporation into electronic chassis controllers, which will permit adjusting the damping force within extremely short control times, and in addition, one that will not just follow specified defaults/characteristic curves, but rather one that can be adapted to the framework of ancillary control systems relevant to the chassis, and that can be incorporated into a comprehensive algorithm and a system of electronic chassis control.

SUMMARY OF THE INVENTION

The above and other objects can be achieved by a controllable shock absorber comprising a damping cylinder filled with damping fluid, with a piston rod linked with a damping piston sliding therein, said piston dividing the damping cylinder into two working spaces, and with at least one controllable damping valve that permits a control of the damping force in the push and pull stages, such that the controllable damping valve is located within a passage that is located between the lower working space found beneath the damping piston, and the upper working space located above the damping piston, and in which the controllable damping valve is designed such that during a piston stroke in the push or pull stage, a flow through the passage that is variable over the duration of the piston stroke can be controlled by means of a variation in the flow cross section at a minimum of one point of the passage.

In this regard, the controllable damping valve is located within a passage that is located between the lower working space found beneath the damping piston, and the upper working space located above the damping piston. The controllable damping valve is designed such that during a piston stroke in the push or pull stage, a flow through the passage that is variable over the duration of the piston stroke can be effected by means of a variation in the flow cross section at a minimum of one point of the passage.

An alternative design solution that is still consistent with the invention of a controllable shock absorber comprising a damping cylinder filled with damping fluid, with a damping piston sliding therein, such that said damping piston is linked with a piston rod and equipped with pressure-dependent valves for the push and pull stages, and where said damping piston divides the damping cylinder into two working spaces, and which is equipped with an additional control valve/controllable damping valve that permits control of the damping force in conjunction with the pressure-dependent valves at the damping pistons of the shock absorber in the push and pull stages. It is a feature according to this invention that the control valve is located within a bypass that is located between the lower working space found beneath the damping piston and the upper working space located above the damping piston, wherein the control valve is designed so that during one piston stroke in the push or pull stage, a flow through the bypass that is variable over the duration of the piston stroke can be controlled by means of a variation in the flow cross section at a minimum of one point of the bypass.

Due to the presently invented design of a controllable damping valve/control valve, it is possible to achieve very short control times and to integrate control of the damping force of the damping into the other electronic chassis controls. Thus, for example, during emergency braking of a motor vehicle, the pitching motion caused by the shift in axle load, i.e., the pitching motion originating from the increased load on the front wheels and the associated, increased jounce of the front axle can be influenced by an ever diminishing flow—specially in the initial phase—through the bypass for the duration of the stroke of the damping piston in the push stage and by the increasingly firmer shock damping associated with it during the piston stroke. In addition, a corresponding, simultaneously increasing, softer damping control can occur at the rear axle.

In a similar manner the rolling movement occurring due to a shift in wheel load during sudden steering and evasive maneuvers can be affected by means of appropriately different damping control for the curve-interior and curve-exterior wheels. The same also applies to yawing motion, i.e., during motions of the vehicle about its vertical axis. If all this is done in the framework of a combination, e.g., with controlled braking of individual wheels in an electronic chassis control, then a significant improvement in driving stability will be achieved from this kind of damping control, in particular in extreme driving situations.

BRIEF DESCRIPTION OF DRAWING

The present invention will be further understood with reference to the accompanying drawing which is a cross sectional view of the controllable shock absorber of the present invention.

DETAILED DESCRIPTION OF THE INVENTION

Figure 1:
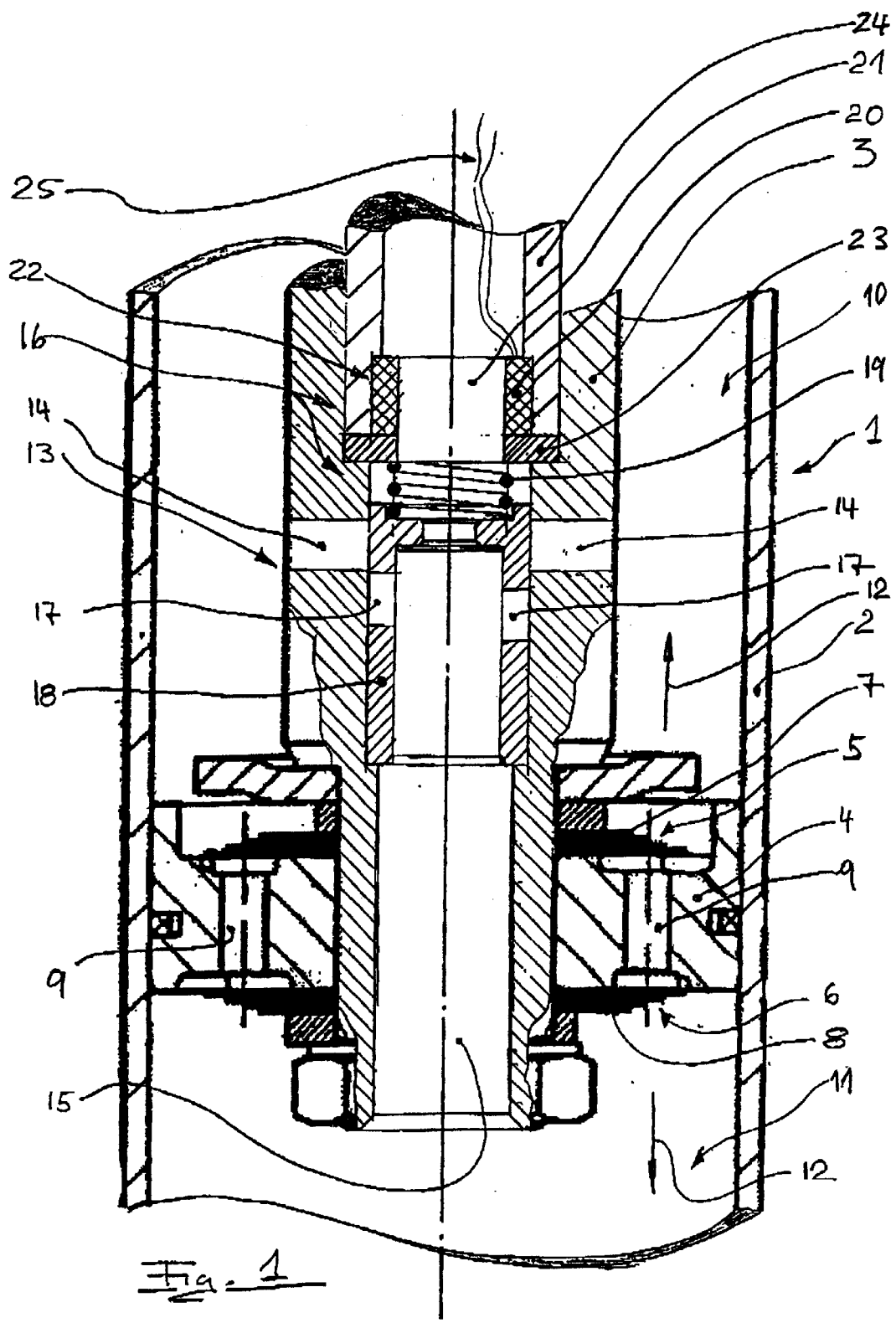

One favorable embodiment of the invention resides in that at a minimum of one point of the passage or bypass there is a valve body that is located within the passage or the bypass and is movable by means of adjusting mechanisms, thus varying the flow cross section; in particular, it is movable by means of adjusting mechanisms designed as electromagnetically or electrodynamically acting devices, which, starting from an at-rest position of the valve body established in particular by spring tension, can affect the relative position of the valve body within the passage or bypass.

In this regard, a valve body, such as a metallic sleeve like that to be described below, can be moved against spring force in a simple manner either by an electromagnet set in the piston rod or by means of a coil located in the sleeve within a magnetic field (plunger coil principle). Thus, the magnetic field can be generated in a known manner, perhaps by a permanent magnet or even by a second coil with a flow of dc current. All the cable leads necessary for this can be laid within the piston rod without any particular expense.

An additional favorable embodiment resides in that the valve body can be moved by the adjusting mechanisms in a translational manner in the direction of the piston rod axis, so that a very simple manufacture of the device providing the valve function will be possible. Another, also favorable, design relative to provision of controlled volumetric flow rate through the bypass, ensuring a minimal and thus rapid movement of the valve body designed as a sleeve, is obtained when the valve body can be moved by the adjusting mechanisms in a rotational manner about the piston rod axis. Also, a combination of these two types of movement, namely a helical movement, of the valve body is quite obviously possible, but will require a guide and thus additional manufacturing steps or machined parts.

In yet another favorable embodiment, sensors are provided within the shock absorber, for example, within the piston rod or the piston, that ascertain the instantaneous position of the valve body in the passage or in the bypass and return this as a processable signal to a control circuit. This kind of position recognition will allow even more precise control by means of refined control algorithms.

A favorable embodiment of the invention in which the control valve can be integrated into the shock absorber, and consequently no additional installation space is required, resides in that the piston rod is of hollow design at least in its lower region and is open at the lower damping cylinder working space located beneath the damping piston, and is equipped above the damping piston with first openings/drilled passages for connecting the upper working space with the piston rod cavity, where the control valve comprises a valve body designed as a sleeve equipped with second openings/drill holes in its walls and moving within the piston rod cavity by means of adjusting mechanisms, wherein the sleeve or the second openings in the walls of the sleeve and the first openings in the hollow piston rod are arranged so that due to a movement of the sleeve relative to the piston rod occurring by means of the adjusting mechanisms, the flow cross section of the first openings to create a bypass is variable, or the first openings and the second openings at least partly overlap to create a bypass, wherein the adjusting devices of the valve body designed as a sleeve, and the geometry of the first and second drill holes, are designed so that during a piston stroke in the push or pull stage, a flow through the passage that is variable over the duration of the piston stroke can be controlled by means of a variation in the flow cross section of the bypass in the region of the openings.

The result will therefore be very simple design and manufacture, in which on the one hand, either the drill holes located in the hollow piston rod can be opened or closed directly by the sleeve movement itself, or on the other hand, openings can be provided both in the piston rod and also in the sleeve that can be made more or less to overlap for the flow of fluid. Of course, both types of construction can be provided side by side, so that several "first" openings are present at different height positions of the hollow piston rod, several of these being opened or closed by the sleeve body itself, and others being openable or closeable by overlap with "second" openings in the sleeve body.

In a design of this kind, in which the valve body is made of a moving sleeve, and in particular when using the plunger coil principle mentioned above, the design of a control valve is possible, for example, for which, in its at-rest position, the first openings will not be entirely closed by the sleeve, or the first openings and the second openings will overlap to provide a permanent bypass in an amount sufficient for the "normal operation" of the shock absorber, and thus permit a prescribed volume to flow through the bypass. Then, of course, the other flow holes and the valve spring plates of the damping piston, if any, will have to be configured and dimensioned accordingly. As soon as the vehicle enters an extreme driving situation and a very severe shock damping occurs at the beginning of a piston stroke, and then thereafter a softer, variable damping is required during the piston travel, the valve body designed as a sleeve can first be moved to a setting in which the first openings are closed, or in which no overlapping of the first openings and second openings is present and the bypass is thus closed (firmest damping). Next, over the course of and during the piston stroke, again an opening can be adjusted—perhaps a greater and changing one in comparison to the at-rest state—which will then allow a more gentle, variable damping. In addition to a "plunger coil principle," of course, other suitable actuation mechanisms can be used here.

In addition, the actuation/movement of the valve body can also occur by means of a tappet or other mechanical transmission element located within the piston rod, so that then the other adjusting mechanisms can be located outside of the piston area, outside of the piston rod, or even outside of the shock absorber.

Of course, in addition to the illustrated configuration of the valve body designed as a sleeve within the hollow piston rod, any other "sleeve arrangement" is also possible; for example, one in which the sleeve surrounds the piston rod or one in which the sleeve is integrated as a part of the piston.

An additional, favorable embodiment of the invention resides in that the geometries of the first and second openings are designed so that with increasing overlap of the openings, a non-linear, in particular, exponentially changing volumetric flow rate can be obtained for the flow through the bypass. For example, the openings can be of a triangular shape or they can be curve-shaped, so that, for example, at the beginning or at end of the overlapping, the volumetric flow rate through the bypass will increase or decrease disproportionately and the control processes, referenced above, during braking or during travel along curves can be even better designed.

Yet another favorable embodiment resides in that the valve body is made essentially of plastic, in particular of plastic equipped with reinforcing materials, such as plastic reinforced with carbon fibers or glass fibers. The low mass of this kind of valve body simplifies the fast adjusting movements required during extreme situations. An actuator needed for movement of this kind of valve body can then be easily embedded, for example, in the plastic matrix.

As has already been discussed in detail, this kind of controllable shock absorber can be used in a particularly favorable manner within an electronic chassis control of a motor vehicle, such that in order to control the shock absorber, the control device is connected to additional control devices, in particular devices such as an electronic-stabilization program (ESP), an antilocking brake system (ABS) or an anti-slip regulation (ASR).

The invention will be explained in greater detail below based on one embodiment example.

FIG. 1 shows a cross section through a controllable shock absorber 1, consisting of a damping cylinder 2 filled with damping fluid and with a damping piston 4, connected to a piston rod 3, sliding therein.

The damping piston is equipped with pressure-dependent valves 5 and 6 for the push and pull stage, which consist essentially of a stack of valve spring retaining plates 7 and 8 that rest upon corresponding passage holes 9 of the damping piston 4 and open in the flow direction during the piston stroke.

The damping piston divides the damping cylinder into two working spaces, namely an upper working space 10 and a lower working space 11.

The damping piston 4, in conjunction with the piston rod 3, is equipped with an additional control valve 13, which in connection with the pressure-dependent valves 5 and 6 at the damping piston 4 of the shock absorber permits control of the damping force in the push and pull stages (in the pull stage, in this design example the piston stroke 12 is upward, and in the push stage it is downward).

For creation of the control valve 13, to begin with, the piston rod 3 is hollow and is designed as open toward the working space 11 located below the damping piston 4. In addition, it is equipped above the damping piston with first openings 14 for connecting the upper working space 10 with the piston rod cavity 15. Also, the control valve consists of a valve element moving within the piston rod cavity 15 by means of servomechanisms 16, said valve body being designed as a sleeve 18 equipped with second openings 17 in its walls.

The second openings 17 in the walls of the sleeve and the first openings 14 in the hollow piston rod are positioned so that, due to a translational movement of the sleeve 18 upward relative to the piston rod occurring by means of the servomechanisms, the first openings and the second openings at least in part can overlap to create a bypass when the servomechanisms have been activated.

In FIG. 1, the at-rest position of the valve body (sleeve 18) is shown as secured in a recess of the hollow piston rod, and it is secured by a coil spring 19.

The coil spring 19, and the electromagnet 22 consisting of coil 20 and core 21, cooperate to act as servomechanisms, and the electromagnet is secured in the hollow piston rod 3 by means of corresponding spacer casings 23 and 24.

As soon as the electromagnet 22 is actuated by means of the inlet lines 25, the metallic valve body (sleeve 18) will move upward relative to the piston rod or relative to the piston, so that the first and second openings 14 and 17 will increasingly overlap and free up a bypass. The geometry of the first and second openings is in this case configured so that during a piston stroke in the push or pull stage, a variable flow will be adjusted in the bypass for the duration of the piston stroke.

Further variations and modifications of the foregoing will be apparent to those skilled in the art and are intended to be encompassed by the claims appended hereto.

German priority application 100 65 184.4-12 is relied on and incorporated herein by reference.

List of Reference Symbols (Refers to the Description)
1 Shock absorber
2 Damping cylinder
3 Piston rod
4 Damping piston
5 Valve
6 Valve
7 Valve spring retaining plate
8 Valve spring retaining plate
9 Drilled passage
10 Upper working space
11 Lower working space
12 Piston stroke
13 Control valve
14 First openings
15 Piston rod cavity
16 Adjusting mechanisms
17 Second openings
18 Sleeve
19 Coil spring
20 Coil
21 Core
22 Electromagnet
23 Spacer casing
24 Spacer casing
25 Inlet line

What is claimed is:

1. A controllable shock absorber comprising a damping cylinder filled with damping fluid, with a piston rod linked with a damping piston sliding therein, said piston dividing the damping cylinder into two working spaces, and with at least one controllable damping valve that permits a control of the damping force in the push and pull stages, such that the controllable damping valve is located within a passage that is located between a lower working space found beneath the damping piston, and an upper working space located above the damping piston, and in which the controllable damping valve is designed such that during a piston stroke in the push or pull stage, a flow through the passage that is variable over the duration of the piston stroke can be controlled by means of a variation in the flow cross section at a minimum of one point of the passage, wherein said valve is movable by means of adjusting mechanisms, thus varying the flow cross section, which starting from an at-rest position of the valve body can affect the relative position of the valve body within the passage and sensors are provided that ascertain the instantaneous position of the valve body in the passage and return this as a processable signal to a control circuit, wherein the valve body can be moved by the adjusting mechanisms in a rotational manner about the piston rod axis.

2. A controllable shock absorber comprising a damping cylinder filled with damping fluid, with a piston rod linked with a damping piston sliding therein, said piston dividing the damping cylinder into two working spaces, and with at least one controllable damping valve that permits a control of the damping force in the push and pull stages, such that the controllable damping valve is located within a passage that is located between a lower working space found beneath the damping piston, and an upper working space located above the damping piston, and in which the controllable damping valve is designed such that during a piston stroke in the push or pull stage, a flow through the passage that is variable over the duration of the piston stroke can be controlled by means of a variation in the flow cross section at a minimum of one point of the passage, wherein said valve is movable by means of adjusting mechanisms, thus varying the flow cross section, which starting from an at-rest position of the valve body can affect the relative position of the valve body within the passage and sensors are provided that ascertain the instantaneous position of the valve body in the passage and return this as a processable signal to a control circuit, wherein the valve body can be moved by the adjusting mechanisms in a translational manner in the direction of the piston rod axis, and the valve body can be moved by the adjusting mechanisms in a rotational manner about the piston rod axis.

3. A controllable shock absorber comprising a damping cylinder filled with damping fluid, with a damping piston sliding therein, said damping piston being linked with a piston rod and equipped with pressure-dependent valves for the push and pull stages, and where said damping piston divides the damping cylinder into two working spaces, and which is equipped with an additional control valve/controllable damping valve that permits control of the damping force in conjunction with the pressure-dependent valves at the damping pistons of the shock absorber in the push and pull stages, characterized in that the control valve is located within a bypass that is located between a lower working space found beneath the damping piston and an upper working space located above the damping piston, wherein the control valve is designed so that during one piston stroke in the push or pull stage, a flow through the bypass that is variable over the duration of the piston stroke can be controlled by means of a variation in the flow cross section at a minimum of one point of the bypass, wherein said valve is movable by means of adjusting mechanisms, thus varying the flow cross section; which, starting from an at-rest position of the valve body can affect the relative position of the valve body within the bypass, and sensors are provided that ascertain the instantaneous position of the valve body in the passage and return this as a processable signal to a control circuit, wherein the piston rod is of hollow design at least in its lower region thereby defining a piston rod cavity and is open at the lower damping cylinder working space located beneath the damping piston, and is equipped above the damping piston with first openings/drill holes for connecting the upper working space with the piston rod cavity, where the control valve consists of a valve body designed as a sleeve equipped with second openings/drill holes in its walls and moving within the piston rod cavity by means of adjusting mechanisms, wherein the sleeve or the second openings in the walls of the sleeve and the first openings in the hollow piston rod are arranged so that due to a movement of the sleeve relative to the piston rod occurring by means of the adjusting mechanisms, the flow cross section of the first openings to create a bypass is variable, or the first openings and the second openings at least partly overlap to create a bypass, wherein the adjusting devices of the valve body designed as a sleeve, and the geometry of the first and second drill holes are designed so that during a piston stroke in the push or pull stage, a flow through the first and second openings that is variable over the duration of the piston stroke can be controlled by means of a variation in the flow cross section of the bypass in the region of the first and second openings, and the geometries of the first and second openings are designed so that with increasing overlap of the openings, a non-linear, volumetric flow rate can be obtained for the flow through the bypass.

4. The controllable shock absorber according to claim 3, wherein said non-linear volumetric flow rate is exponentially changing.

5. The controllable shock abosorber according to claim 3, wherein the geometries of the first and second openings are designed so that with increasing overlap of the openings, an exponentially changing volumetric flow rate can be obtained for the flow through the bypass.

6. A controllable shock abosorber comprising a damping cylinder filled with damping fluid, with a piston rod linked with a damping piston sliding therein, said piston dividing the damping cylinder into two working spaces, and with at least one controllable damping valve that permits a control of the damping force in the push and pull stages, such that the controllable damping valve is located within a passage that is located between a lower working space found beneath the damping piston, and an upper working space located above the damping piston, and in which the controllable damping valve is designed such that during a piston stroke in the push or pull stage, a flow through the passage that is variable over the duration of the piston stroke can be controlled by means of a variation of the flow cross section at a minimum of one point of the passage, wherein at a minimum of one point of the passage or in a bypass there is a valve body that is located within the passage or the bypass and is movable by means of adjusting mechanisms, thus varying the flow cross section which, starting from an at-rest position of the valve body, can affect the relative position of the valve body within the passage or bypass, said valve body being movable by the adjusting mechanisms in a translational manner in the direction of the piston rod axis, and by the adjusting mechanisms in a rotational manner about the piston rod axis.

7. A controllable shock absorber comprising a damping cylinder filled with damping fluid, with a piston rod linked with a damping piston sliding therein, said piston dividing the damping cylinder into two working spaces, and with at least one controllable damping valve that permits a control of the damping force in the push and pull stages, such that the controllable damping valve is located within a passage that is located between a lower working space found beneath the damping piston, and an upper working space located above the damping piston, and in which the controllable damping valve is designed such that during a piston stroke in the push or pull stage, a flow through the passage that is variable over the duration of the piston stroke can be controlled by means of a variation in the flow cross section at a minimum of one point of the passage, wherein wherein at a minimum of one point of the passage or in a bypass there is a valve body that is located within the passage or the bypass and is movable by means of adjusting mechanisms, thus varying the flow cross section, which, starting from an at-rest position of the valve body can affect the relative position of the valve body within the passage or bypass, wherein the valve body can be moved by the adjusting mechanisms in a rotational manner about the piston rod axis.

8. A controllable shock absorber comprising a damping cylinder filled with damping fluid, with a damping piston sliding therein, said damping piston being linked with a piston rod and equipped with pressure-dependent valves for the push and pull stages, and where said damping piston divides the damping cylinder into two working spaces, and which is equipped with an additional control valve/controllable damping valve that permits control of the damping force in conjunction with the pressure-dependent valves at the damping pistons of the shock absorber in the push and pull stages, characterized in that the control valve is located within a bypass that is located between a lower working space found beneath the damping piston and an upper working space located above the damping piston, wherein the control valve is designed so that during one piston stroke in the push or pull stage, a flow through the bypass that is variable over the duration of the piston stroke can be controlled by means of a variation in the flow cross section at a minimum of one point of the bypass, wherein the piston rod is of hollow design at least in its lower region thereby defining a piston and cavity and is open at the lower damping cylinder working space located beneath the damping piston, and is equipped above the damping piston with first openings/drilled holes for connecting the upper working space with the piston rod cavity, where the control valve consists of a valve body designed as a sleeve equipped with second openings/drill holes in its walls and moving within the piston rod cavity by means of adjusting mechanisms, wherein the sleeve or the second openings in the walls of the sleeve and the first openings in the hollow piston rod are arranged so that due to a movement of the sleeve relative to the piston rod occurring by means of the adjusting mechanisms, the flow cross section of the first openings to create a bypass is variable, or the first openings and the second openings at least partly overlap to create a bypass, wherein the adjusting devices of the valve body designed as a sleeve, and the geometry of the first and second drill holes are designed so that during a piston stroke in the push or pull stage, a flow through the first and second openings that is variable over the duration of the piston stroke can be controlled by means of a variation in the flow cross section of the bypass in the region of the first and second openings, the geometries of the first and second openings being designed so that with increasing overlap of the openings, a non-linear, changing volumetric flow rate can be obtained for the flow through the bypass.

* * * * *